(12) United States Patent
Chuang et al.

(10) Patent No.: US 11,736,704 B1
(45) Date of Patent: Aug. 22, 2023

(54) METHODS AND APPARATUSES OF SATD FOLDING HARDWARE DESIGN IN VIDEO ENCODING SYSTEMS

(71) Applicant: MEDIATEK INC., Hsinchu (TW)

(72) Inventors: Cheng-Yen Chuang, Hsinchu (TW); Man-Shu Chiang, Hsinchu (TW); Chun-Chia Chen, Hsinchu (TW); Chih-Wei Hsu, Hsinchu (TW); Tzu-Der Chuang, Hsinchu (TW); Ching-Yeh Chen, Hsinchu (TW); Yu-Wen Huang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 17/702,345

(22) Filed: Mar. 23, 2022

(51) Int. Cl.
*H04N 19/42* (2014.01)
*H04N 19/176* (2014.01)
*H04N 19/159* (2014.01)
*H04N 19/132* (2014.01)

(52) U.S. Cl.
CPC ........... *H04N 19/42* (2014.11); *H04N 19/132* (2014.11); *H04N 19/159* (2014.11); *H04N 19/176* (2014.11)

(58) Field of Classification Search
CPC .... H04N 19/42; H04N 19/132; H04N 19/159; H04N 19/176
See application file for complete search history.

(56) References Cited

U.S. PATENT DOCUMENTS

2007/0198622 A1* 8/2007 Jou ...................... G06F 17/145
708/400

FOREIGN PATENT DOCUMENTS

| CN | 101277445 B | 7/2010 |
| CN | 106488236 A | 3/2017 |
| CN | 111836050 A | 10/2020 |

OTHER PUBLICATIONS

Chinese language office action dated May 23, 2023, issued in application No. TW 111119963.

* cited by examiner

*Primary Examiner* — Nam D Pham
(74) *Attorney, Agent, or Firm* — McClure, Qualey & Rodack, LLP

(57) ABSTRACT

Video encoding methods and apparatuses for Sum of Absolute Transformed Difference (SATD) computation by folded Hadamard transform circuits include splitting a current block into SATD blocks, receiving input data associated with a first block of a first SATD block in a first cycle and receiving input data associated with a second block of the first SATD block in a second cycle, and performing calculations for the first block by shared Hadamard transform circuits in the first cycle and performing calculations for the second block by the shared Hadamard transform circuits in the second cycle. Each shared Hadamard transform circuit is a first part of each folded Hadamard transform circuit. The video encoding methods and apparatuses further perform calculations for the entire SATD block by a final part of each folded Hadamard transform circuit to generate a final SATD result of the first SATD block for encoding.

18 Claims, 9 Drawing Sheets

METHODS AND APPARATUSES OF SATD FOLDING HARDWARE DESIGN IN VIDEO ENCODING SYSTEMS

FIELD OF THE INVENTION

The present invention relates to video data processing methods and apparatuses for video encoding. In particular, the present invention relates to hardware design for distortion calculation in video encoding.

BACKGROUND AND RELATED ART

The Versatile Video Coding (VVC) standard is the latest video coding standard developed by the Joint Collaborative Team on Video Coding (JCT-VC) group of video coding experts from ITU-T Study Group. The VVC standard inherited former High Efficiency Video Coding (HEVC) standard which relies on a block-based coding structure, where each video picture contains one or a collection of slices and each slice is divided into an integer number of Coding Tree Units (CTUs). The individual CTUs in a slice are processed according to a raster scanning order. Each CTU is further recursively divided into one or more Coding Units (CUs) to adapt to various local motion and texture characteristics. The prediction decision is made at the CU level, where each CU is coded according to a best coding mode selected according to a Rate Distortion Optimization (RDO) technique. The video encoder exhaustively tries all the mode combinations to select a best coding mode for each CU in terms of maximizing the coding quality and minimizing bit rates. A specified prediction stage is employed to predict the values of associated pixel samples inside each CU. After obtaining a residual signal generated by the prediction stage, residual data of the residual signal belong to a CU is then transformed into transform coefficients for compact data representation. These transform coefficients are quantized and conveyed to the decoder. The terms Coding Tree Block (CTB) and Coding block (CB) are defined to specify two-dimensional sample array of one color component associated with the CTU and CU respectively. For example, a CTU consists of one luminance (luma, Y) CTB, two chrominance (chroma, Cb and Cr) CTBs, and its associated syntax elements.

Video data in a CU may be computed by a low-complexity RDO stage followed by a high-complexity RDO stage. For example, prediction is performed in the low-complexity RDO stage while Differential Pulse Code Modulation (DPCM) is performed in the high-complexity RDO stage. In the low-complexity RDO stage, a Sum of Absolute Transform Difference (SATD) or Sum of Absolute Difference (SAD) associated with a coding mode applied to a block is computed for determining a best coding mode for the block. SATD is a block matching criterion widely used in fractional Motion Estimation (ME) for video compression. It works by taking a frequency transform, usually a Hadamard transform, of differences between the pixels in the original block and corresponding pixels in the block being used for comparison. In comparison to SAD, SATD more accurately models the number of bits required to transmit the residual error signal. To compute a SATD of a CU coded by a coding mode, the CU may be split into smaller partitions with a transform size, and the SATD of the CU is equal to a sum of the distortion value of each partition within the CU. For example, the transform size for SATD computation may be 4×4, 4×8, or 4×16. Experiment results prove the larger the transform size for SATD computation, the smaller the compression loss (e.g. lower BD-rate), however, larger transform size for SATD computation increases hardware costs and causes lower utilization problems. FIG. 1 shows the hardware utilization of 4×4 SATD, 4×8 SATD, and 4×16 SATD assuming the throughput of the prediction stage is 4×4 samples. The hardware utilization of processing a 4×4 SATD block 12 is close to 100%, the hardware utilization of processing a 4×8 SATD block 14 is about 50% as the encoder is idle half of the time in order to wait for the entire 4×8 SATD block, and the hardware utilization of processing a 4×16 SATD block 16 is only 25% as the encoder is idle three quarter of the time to wait for the entire 4×16 SATD block. It may not be a good trade-off to design a SATD hardware circuit for processing SATD blocks larger than the throughput of the prediction stage.

BRIEF SUMMARY OF THE INVENTION

In some embodiments of a video encoding method for computing a Sum of Absolute Transformed Difference (SATD) of a current block by folded Hadamard transform circuits in a video encoding system, the method comprises splitting the current block into one or more SATD blocks, receiving input data associated with a first block of a first SATD block in a first cycle and receiving input data associated with a second block of the first SATD block in a second cycle after the first cycle, and performing calculations for the first block by shared Hadamard transform circuits in the first cycle and performing calculations for the second block by the shared Hadamard transform circuits in the second cycle. Each shared Hadamard transform circuit is a first part of each of the folded Hadamard transform circuits. The video encoding method further comprises performing calculations for the entire first SATD block by a final part of each folded Hadamard transform circuit to generate a final SATD result of the first SATD block, and accumulating the final SATD result(s) of the one or more SATD blocks in the current block to generate a final SATD result of the current block. The final SATD result of the current block is used to encode the current block.

Each SATD block is a 4×8 block in some embodiments, where the first block is a top 4×4 block of the 4×8 block and the second block is a bottom 4×4 block of the 4×8 block. Calculations for the entire first SATD block to generate the final SATD result for the first SATD block is performed in the second cycle. The folded Hadamard transform circuits are folded 8-point Hadamard transform circuit, and the shared Hadamard transform circuits are 4-point Hadamard transform circuits. In some other embodiments, each SATD block is a 4×16 block, where the first block is a top 4×4 block of the 4×16 block and the second block is a second 4×4 block of the 4×16 block. The video encoding method further receives input data associated with a third 4×4 block of the 4×16 block and performs calculations for the third 4×4 block by the shared Hadamard transform circuits in a third cycle after the second cycle, and receives input data associated with a fourth 4×4 block of the 4×16 block and performs calculations for the fourth 4×4 block by the shared Hadamard transform circuits in a fourth cycle after the third cycle. Calculations for the entire first SATD block to generate the final SATD result is performed in the fourth cycle. In some embodiments, the second cycle is next to or following the first cycle. For example, the first cycle is an even or odd cycle, and the second cycle is an odd cycle following the even cycle or an even cycle following the odd cycle.

A calculation order in the folded Hadamard transform circuits allows the calculations related to the first block of the first SATD block are computed in the first cycle. The encoding method further comprises buffering temporary results of the first block of the first SATD block computed by the shared Hadamard transform circuits in multiple registers. In an embodiment of the present invention, performing calculations for the entire first SATD block by a final part of each folded Hadamard transform circuit comprises combining temporary results of the second block of the SATD block computed by the shared Hadamard transform circuits with data stored in the register.

The final part of each folded Hadamard transform circuit includes multiple absolute operations and registers according to some embodiments. Each absolute operation is shared by multiple inputs. For example, each absolute operation has two inputs for processing 4×8 SATD blocks. Performing calculations for the entire first SATD block by a final part of each folded Hadamard transform circuit comprises storing some of the multiple inputs to the absolute operations in the registers and processing the multiple inputs by the absolute operations in a time interleaving manner. According to some embodiments, the registers buffer temporary result of the shared Hadamard transform circuits in even cycles and buffer some of the multiple inputs to the absolute operations in odd cycles.

In some embodiments of the present invention, the folded Hadamard transform circuits used to compute a SATD are reused for Sum of Absolute Difference (SAD) computation.

In an embodiment, input data associated with the current block includes differences between original samples and a predictor of the current block, and performing calculations to generate the final SATD result includes applying a Hadamard transform to the differences to generate transform differences for the current block. In another embodiment, the current block is encoded by a Bi-prediction with Coding Unit level Weights (BCW) candidate with a set of weights, input data of the current block includes a List 0 (L0) predictor, a List 1 (L1) predictor, and original samples of the current block. The step of performing calculations includes applying a Hadamard transform to the L0 predictor, applying a Hadamard transform to the L1 predictor, and applying a Hadamard transform to the original samples. The final SATD result of encoding the current block by the BCW candidate is derived by the Hadamard transform of the L0 predictor and the Hadamard transform of the L1 predictor multiplying the set of weights, and the Hadamard transform of the original samples. The Hadamard transform of the L0 predictor, the Hadamard transform of the L1 predictor, and the Hadamard transform of the original samples are reused in calculating the final SATD result of encoding the current block by another BCW candidates having same or different L0 and L1 predictors.

Aspects of the disclosure further provide an apparatus for the video encoding system to compute a SATD of a current block by folded Hadamard transform circuits. The apparatus comprises one or more electronic circuits configured for splitting the current block into one or more SATD blocks, receiving input data associated with a first block of a first SATD block in a first cycle and receiving input data associated with a second block of the first SATD block in a second cycle, and performing calculations for the first block by shared Hadamard transform circuits in the first cycle and performing calculations for the second block by the shared Hadamard transform circuits in the second cycle. Each shared Hadamard transform circuit is a first part of each of the folded Hadamard transform circuits. The apparatus performs calculations for the entire first SATD block by a final part of each folded Hadamard transform circuit to generate a final SATD result of the first SATD block, and accumulate the final SATD results(s) of the one or more SATD blocks in the current block to generate a final SATD result of the current block. The current block is encoded according to the final SATD result of the current block. Other aspects and features of the invention will become apparent to those with ordinary skill in the art upon review of the following descriptions of specific embodiments.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF THE INVENTION

Figure 1:
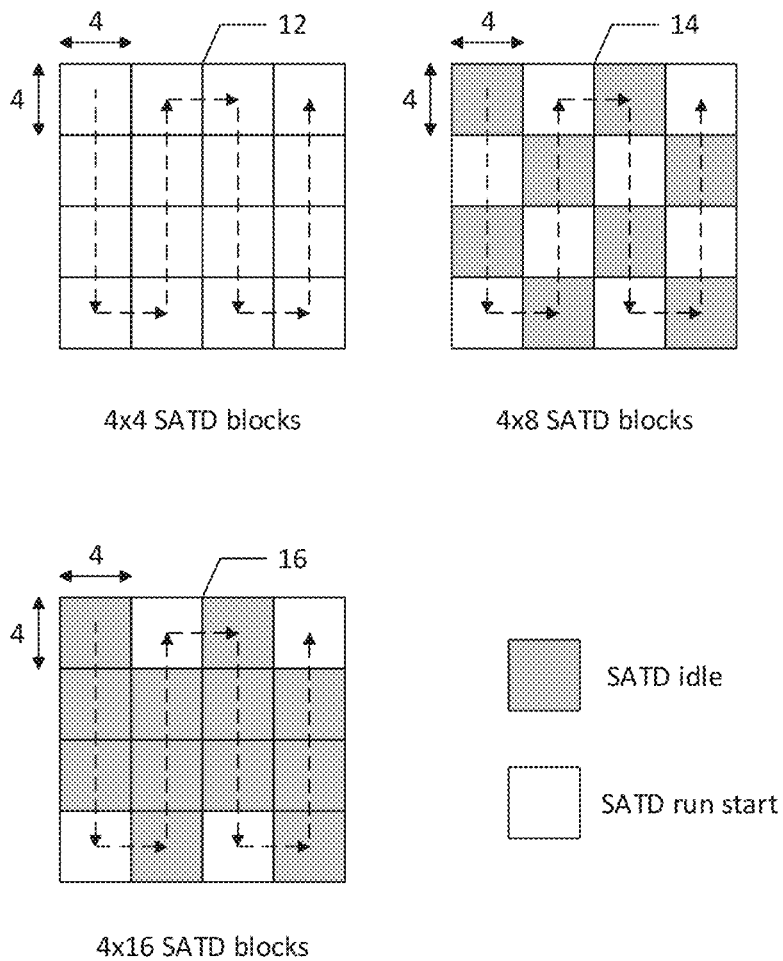
FIG. 1 illustrates the hardware utilization rates of three SATD transform sizes when the throughput of the prediction stage is 4×4 samples.

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Reference throughout this specification to "an embodiment", "some embodiments", or similar language means that a particular feature, structure, or characteristic described in connection with the embodiments may be included in at least one embodiment of the present invention. Thus, appearances of the phrases "in an embodiment" or "in some embodiments" in various places throughout this specification are not necessarily all referring to the same embodiment, these embodiments can be implemented individually or in conjunction with one or more other embodiments. Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

Sum of Absolute Transformed Difference Calculation In the Low-Complexity (LC) Rate Distortion Optimization (RDO) stage, the video encoder computes a SATD of a CU by splitting the CU into smaller SATD blocks and accumulating the SATD results of the smaller SATD blocks. For example, a 64×64 CU is split into 128 4×8 SATD blocks and the SATD result of the 64×64 CU is a sum of the SATD results of the 128 SATD blocks. The 64×64 CU may be split into 64 4×16 SATD blocks and the SATD result of the 64×64 CU is a sum of the SATD results of the 64 SATD blocks. The coding loss of larger SATD blocks is typically smaller than the coding loss of smaller SATD blocks, however, encoding time required for computing larger SATD blocks is much longer. A good tradeoff between the coding efficiency and computational complexity is determined by the video encoder. In VVC Test Model (VTM), to compute a SATD of a current block with a width w and a height h, differences $D_{w*h}$ in original samples $Source_{w*h}$ of the current block and predictor $Pred_{w*h}$ of the current block are calculated, and the differences $D_{w*h}$ is transformed by a Hadamard transform to generate transformed differences $D'_{w*h}$. The SATD of the current block is computed using this transform differences $D'_{w*h}$ according to the follow equations.

$$D_{w*h} = Pred_{w*h} - Source_{w*h}; D'_{w*h} = H_{w*w} D_{w*h} H_{h*h};$$

$$SATD_{w*h} = \frac{2}{\sqrt{w*h}} (\sum (abs(D'_{w*h})) - abs(D'_{w*h}(0)) + abs(D'_{w*h}(0)) \gg 2);$$

where $H_{w*w}$ is Hadamard transform with a w*w size.

The transform differences $D'_{w*h}$ for a 4×4 SATD block is calculated by matrix multiplication of the differences $D_{w*h}$ and Hadamard transform matrices as shown in the following.

$$D'_{4\times4} = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \begin{bmatrix} d_{00} & d_{01} & d_{02} & d_{03} \\ d_{10} & d_{11} & d_{12} & d_{13} \\ d_{20} & d_{21} & d_{22} & d_{23} \\ d_{30} & d_{31} & d_{32} & d_{33} \end{bmatrix} \begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

Figure 2:
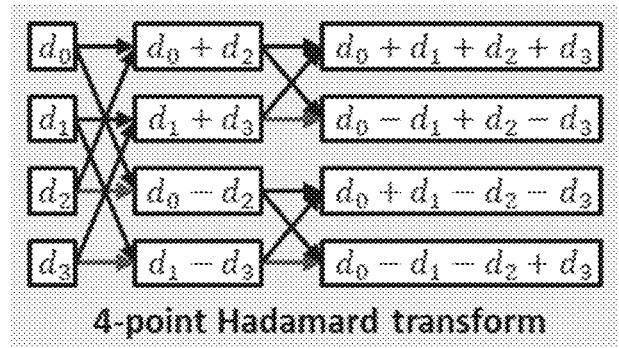
FIG. 2 illustrates a hardware design of a circuit for computing a SATD for a 4×4 SATD block and an illustration of a 4-point Hadamard transform circuit forming the circuit.
Figure 2:
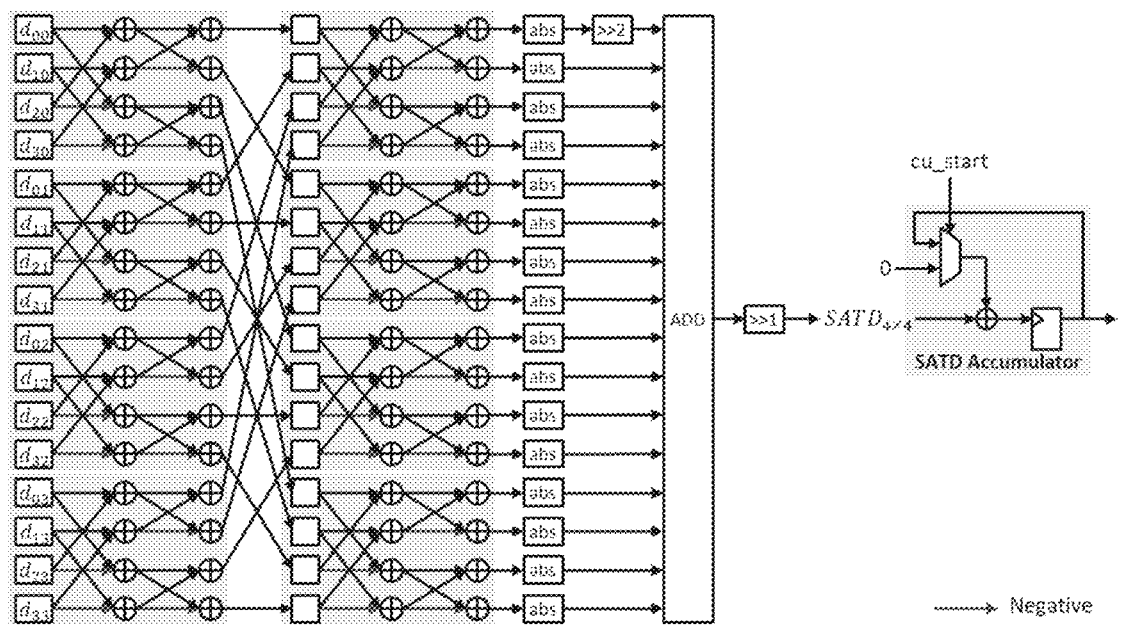
Figure 3:
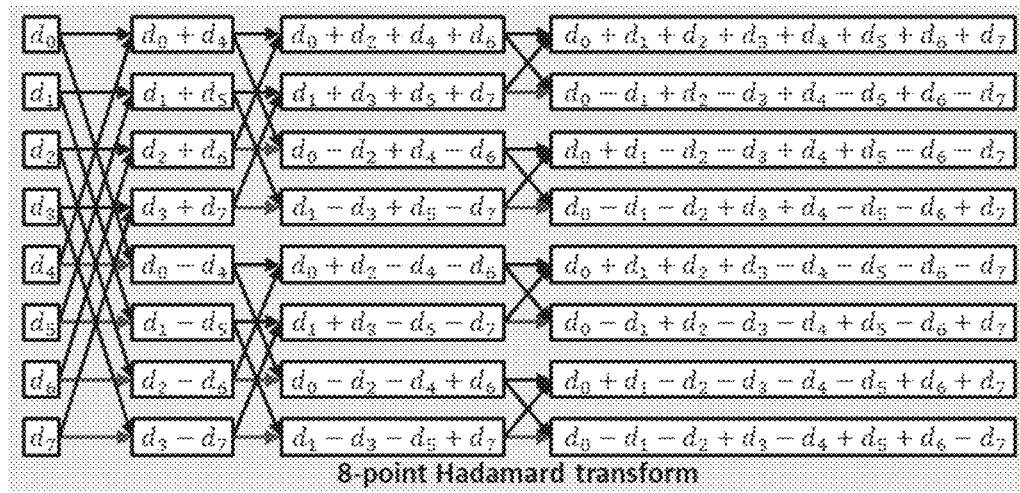
FIG. 3 illustrates a normal 8-point Hadamard transform circuit used to compute a portion of the SATD of a 4×8 SATD block.

Hadamard transform and SATD calculation can be realized by a hardware circuit, which transforms 4×4 differences $D_{4*4}$ or 4×8 differences $D_{4*8}$ of a current block into transform differences $D'_{4*4}$ or $D'_{4*8}$. The hardware circuit then accumulates the absolute values of the transform differences to generate a SATD result for the current block. FIG. 2 shows the hardware design of a circuit for computing a 4×4 SATD, and since the matrix entries in the Hadamard transform are 1 or −1, the hardware design for SATD computation is realized by addition and subtraction operations without any multiplication operations. The circuit for computing the 4×4 SATD is composed of eight 4-point Hadamard transform circuit, and the computation operations within each 4-point Hadamard transform circuit is shown in FIG. 2. A current block such as a current Coding Unit (CU) is split into one or more SATD blocks and an SATD accumulator is used to accumulate the SATD(s) of the SATD block(s) within the current block. FIG. 3 shows the transform differences $D'_{4*8}$ for a 4×8 SATD block computed by matrix multiplication and an 8-point Hadamard transform circuit used for calculating a portion of the 4×8 SATD of a 4×8 SATD block. The hardware utilization rate is about 50% if the hardware design for calculating the 4×8 SATD directly implements the circuit by the normal 8-point Hadamard transform circuits the one as shown in FIG. 3. The hardware utilization rate is only half because the encoder needs to wait for the bottom 4×4 block (e.g. $d_4$ to $d_7$ in FIG. 3) of the 4×8 SATD block to calculate the SATD of the entire 4×8 SATD block.

Figure 4:
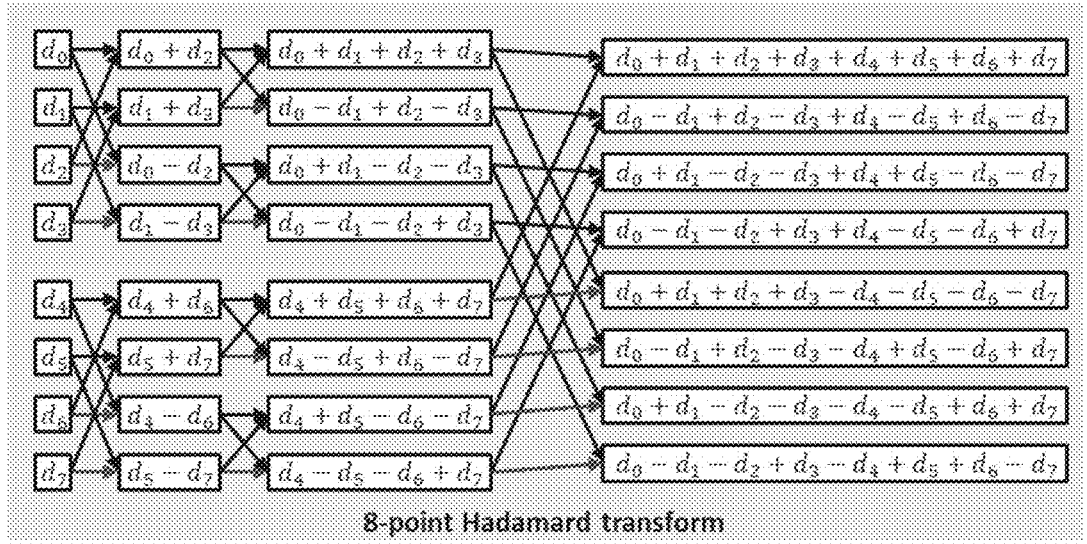
FIG. 4 illustrates a change in a calculation order of a first part of the 8-point Hadamard transform circuit, where the first part is equivalent to two 4-point Hadamard transform circuits.

Folded 8-point Hadamard Transform Circuit The calculation order in the 8-point Hadamard transform can be slightly changed due to the regularity of the Hadamard matrix in order to perform some calculations for a 4×8 SATD block before receiving the bottom 4×4 block of the 4×8 SATD block. FIG. 4 shows an embodiment of changing the calculation order in an 8-point Hadamard transform circuit so the first part of the 8-point Hadamard transform circuit is equivalent to two 4-point Hadamard transform circuits. In each cycle, only 4 input samples are received, for example, $d_0$ to $d_3$ as shown in FIG. 4 are received in an even cycle (e.g. cycle 0), and $d_4$ to $d_7$ are received in an odd cycle following the even cycle (e.g. cycle 1). In another example, $d_0$ to $d_3$ as shown in FIG. 4 are received in an odd cycle (e.g. cycle 1), and $d_4$ to $d_7$ are received in an even cycle following the odd cycle (e.g. cycle 2). By changing the calculation order in the 8-point Hadamard transform circuit, all the calculations related to the 4 input samples $d_0$ to $d_3$ can be computed first, and calculations related to the next 4 input samples $d_4$ to $d_7$ can be computed in a next cycle. The hardware design of the first part of the 8-point Hadamard transform circuit can be replaced by one 4-point Hadamard transform circuit used in calculating 4×4 SATDs. After receiving the second 4 input samples $d_4$ to $d_7$, the final part of the 8-point Hadamard transform circuit can be calculated in the odd cycle following the even cycle (e.g. cycle 1) or the even cycle following the odd cycle (e.g. cycle 2).

Figure 5:
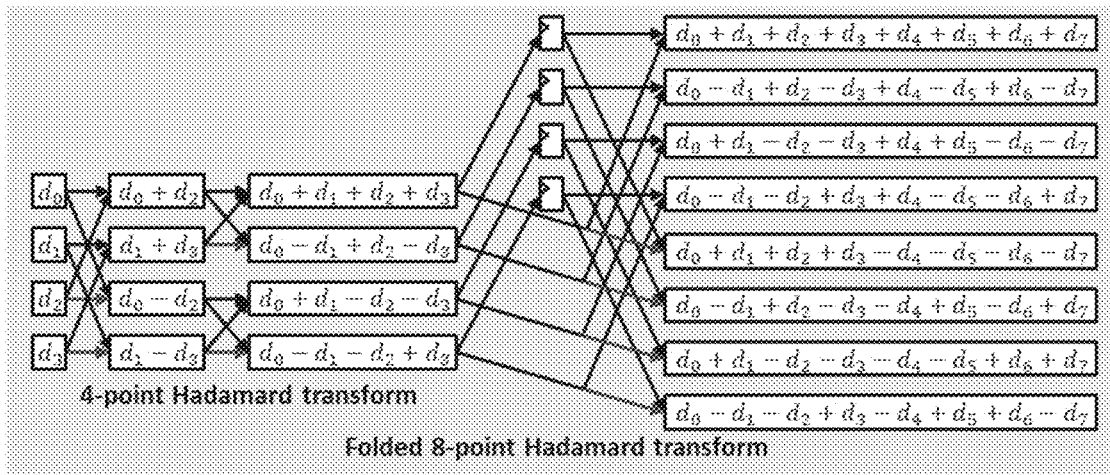
FIG. 5 illustrates a folded 8-point Hadamard transform circuit used to compute a portion of the SATD of a 4×8 SATD block according to an embodiment of the present invention.

The circuit area for calculating a 4×8 SATD can be reduced by a folding technique. The first part of the 8-point Hadamard transform circuit is folded, which means one 4-point Hadamard transform circuit is used for calculating a top 4×4 block and a bottom 4×4 block of each 4×8 block in a time interleaving manner. By adding some registers to buffer temporary data, only one 4-point Hadamard transform circuit is needed in each folded 8-point Hadamard transform circuit to calculate temporary results related to a top 4×4 block in an even cycle and calculate temporary results related to a bottom 4×4 block in an odd cycle. FIG. 5 shows a folded 8-point Hadamard transform circuit according to an embodiment of the present invention. For example, for data of each even cycle, such as cycle 0, 2, or 4, the 4-point temporary results computed by the 4-point Hadamard transform circuit are stored in the registers. For data of each odd cycle, such as cycle 1, 3, or 5, the 4-point temporary results computed by the 4-point Hadamard transform circuit will combine with the data stored in the registers to generate the results of the 8-point Hadamard transform circuit. In comparison to the normal 8-point Hadamard transform circuit as shown in FIG. 3 which is idle in every even cycle, the 4-point Hadamard transform circuit in the folded 8-point Hadamard transform circuit computes in every cycle. In other words, the hardware utilization rate is only 50% for the entire normal 8-point Hadamard transform circuit, while the hardware utilization rate is 100% in the first part of the folded 8-point Hadamard transform circuit (i.e. the 4-point Hadamard transform circuit) and 50% in the final part of the folded 8-point Hadamard transform circuit. The circuit area of the folded 8-point Hadamard transform circuit is also smaller than the normal 8-point Hadamard transform circuit as there are only 16 addition operations plus 4 registers in the folded 8-point Hadamard transform circuit compared to 24 addition operations in the normal 8-point Hadamard transform circuit. The above example of the folded Hadamard transform circuit is for computing a 4×8 SATD, the folded Hadamard transform circuit can be designed in a similar way for computing SATDs for SATD blocks with other transform sizes.

Figure 6:
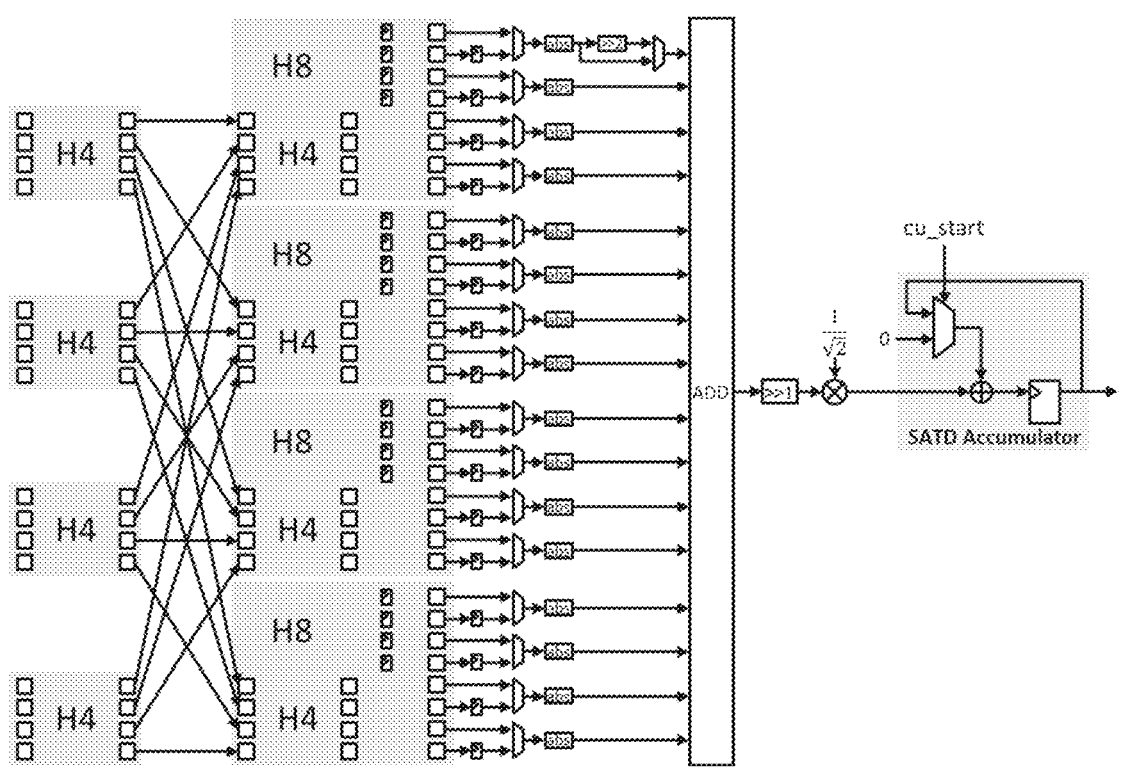
FIG. 6 illustrates a hardware design of a circuit implementing the folded 8-point Hadamard transform circuits for computing a SATD for a 4×8 SATD block according to an embodiment of the present invention.

Further Hardware Reduction in SATD Circuit An 8-point Hadamard transform circuit or a folded 8-point Hadamard transform circuit outputs 1 result in every 2 cycles, the hardware cost can be further reduced by buffering half of the internal results. In this way, the overall hardware utilization rate for the 8-point Hadamard transform circuit or folded 8-point Hadamard transform circuit can also be improved. FIG. 6 illustrates a SATD circuit employing folded 8-point Hadamard transform circuits for computing SATDs for 4×8 SATD blocks according to an embodiment of the present invention. The last part of each folded 8-point Hadamard transform circuit only computes in every second cycle, the utilization rate for the last part of each folded 8-point Hadamard transform circuit is 50%. In some embodiments of the present invention, the number of absolute operations required in accumulation for a SATD circuit is reduced as each absolute operation can be shared by multiple inputs according to the hardware utilization rate of the last part of the Hadamard transform circuits. The number of absolute operations can be reduced by storing some of the inputs in registers. For example, the number of absolute operations is reduced from 32 to 16 by including 16 registers in the folded 8-point Hadamard transform circuits as shown in FIG. 6. For accumulation in a SATD circuit, the 32-input adder receiving the outputs of the absolute operations is also reduced to a 16-input adder according to this embodiment. In another example, the number of absolute operations required in a SATD circuit employing folded 16-point Hadamard transform circuits for computing a 4×16 SATD is reduced to one quarter. This reduction in hardware circuit can be implemented in SATD circuits employing normal or folded Hadamard transform circuits because the utilization rate for the entire normal Hadamard transform circuit is the same as the last part of the folded Hadamard transform circuit. For example, the utilization rate for the normal 8-point Hadamard transform circuit is 50% and the utilization rate for the normal 16-point Hadamard transform circuit is 25%. The number of absolute operations in a SATD circuit employing normal 8-point Hadamard transform circuits for computing 4×8 SATD is reduced by half according to an embodiment, and the number of absolute operations in a SATD circuit employing normal 16-point Hadamard transform circuits for computing 4×16 SATD is reduced to one quarter according to another embodiment.

Figure 7:
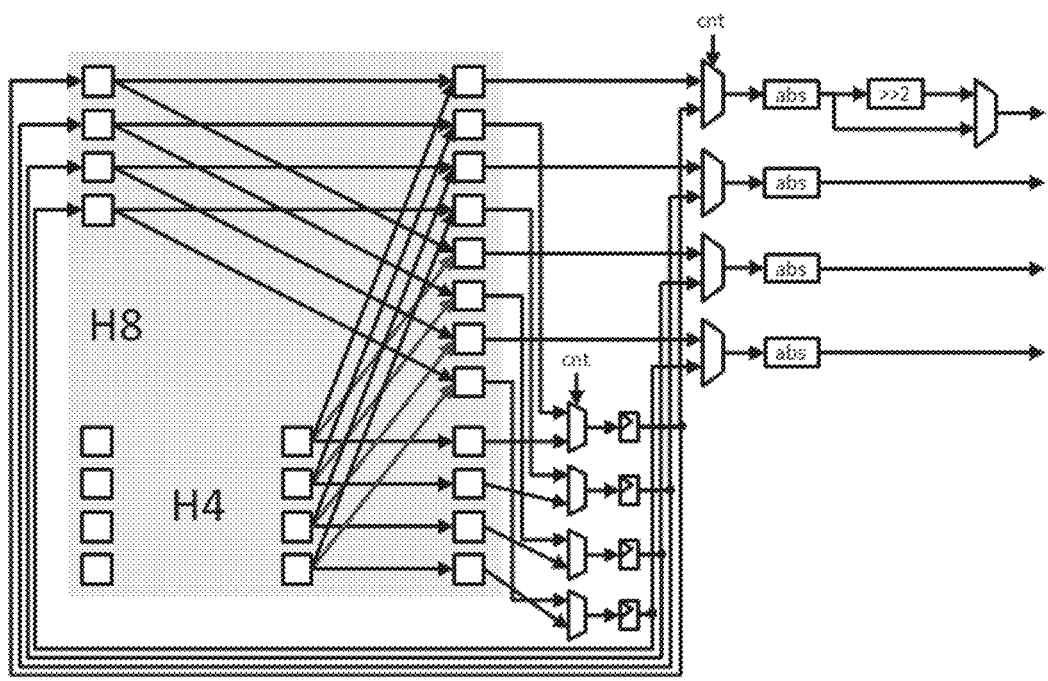
FIG. 7 illustrates an embodiment of sharing registers of the circuit used to compute a SATD for a 4×8 SATD block.

In some other embodiments, the number of registers in the SATD circuit employing the folded Hadamard transform circuits is further reduced by sharing the registers in a way as shown in FIG. 7. There are two groups of registers in the SATD circuit employing folded 8-point Hadamard transform circuits as shown in FIG. 6. A first group of registers is used to buffer 4-point temporary results and a second group of registers is used to buffer half of the 8-point temporary results. The first group of registers is accessed in every even cycle while the second group of registers is accessed in every odd cycle according to an embodiment. In another embodiment, the first group of registers is accessed in every odd cycle while the second group of register is accessed in every even cycle. An embodiment of sharing the registers in the SATD circuit employing folded 8-point Hadamard transform circuits is illustrated by an exemplary folded 8-point Hadamard transform circuit used for computing a column of the Hadamard matrix in FIG. 7, where only one group of registers is needed. This group of registers contains 4 registers for computing a column of the Hadamard matrix, and the 4 registers buffer 4-point temporary results in even cycles and buffer half of the 8-point temporary results in odd cycles. Since there are enormous of SATD circuits required in the LC RDO stage, reducing some registers in each SATD circuit greatly saves the hardware cost of the video encoder.

Figure 8:
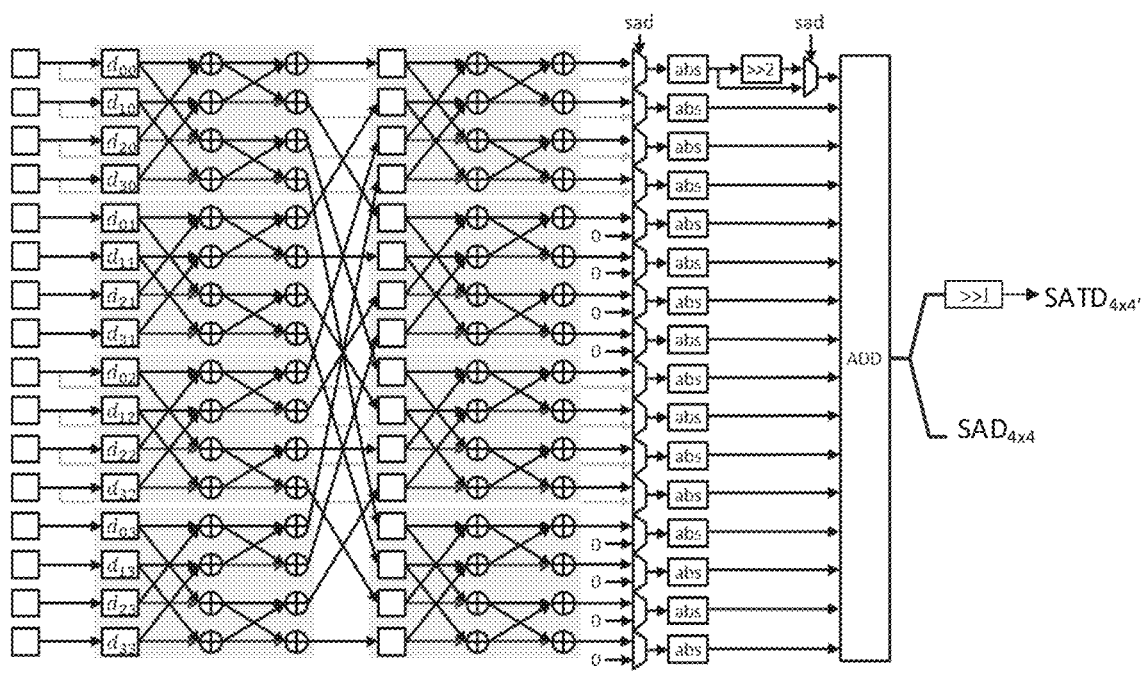
FIG. 8 illustrates reusing the circuit for computing a SATD for a 4×4 SATD block to compute an even row SAD according to an embodiment of the present invention.

Shared Circuit for SATD and SAD In the VVC standard, the Decoder side Motion Vector Refinement (DMVR) mode uses even-row SAD to calculate distortions. The DMVR mode can be easily added to any Processing Element (PE) with slightly changes in the hardware if the SATD circuit can be reused for calculating SAD values. Embodiments of the present invention reuse the SATD circuits for SAD computation. For example, the even-row input data bypasses the Hadamard transform circuit and directly goes to the even-row absolute circuits of the SATD circuit, and instead of feeding the odd-row data into the circuit, 0 is feed into every odd-row absolute circuit of the SATD circuit. The SATD circuit implanted by the normal Hadamard transform circuits or folded Hadamard transform circuits can be reused to compute even-row SADs. FIG. 8 illustrates an example of reusing a 4×4 SATD circuit for computing even row SAD values for the DMVR mode according to an embodiment of the present invention. In some other embodiments, a 4×8 SATD circuit or a 4×16 SATD circuit can be reused to compute even row SAD values for the DMVR mode. Not only the even-row SAD of the DMVR mode can be computed by the SATD circuits, the SATD circuits can be reused to compute any kind of SADs.

BCW Hadamard Transform Reusing Bi-Prediction with CU-level Weights (BCW) is a coding tool allows different weights for List 0 (L0) and List 1 (L1) predictors in bi-prediction. The bi-prediction predictor $P_{bi\text{-}pred}$ of a CU coded in BCW is generated by the following equation with one weighting parameter w signaled for the CU.

$$P_{bi\text{-}pred}=((8-w)*P_0+w*P_1+4)>>3;$$

where P0 is the L0 predictor and P1 is the L1 predictor of the CU. There are five w options for low-delay pictures {−2, 3, 4, 5, 10}, and there are three w options for non-low-delay pictures {3, 4, 5}. The Hadamard transform for computing the SATD of a BCW bi-prediction candidate is equal to the Hadamard transform of a difference between the BCW bi-prediction predictor and the original data of the CU as shown in the following equation.

$$H(P_{bi\text{-}pred}-\text{orig})=H(((8-w)P0+wP1=4)>>3-\text{orig});$$

where orig is the original samples of the CU. This equation can be rewritten as below based on the linearity property of Hadamard transform.

$$H(P_{bi\text{-}pred}-\text{orig})=((8-w)H(P_0)+wH(P_1))>>3-H(\text{orig})$$

According to an embodiment of the present invention, a Hadamard transform is applied to the L0 predictor, L1 predictor, and original samples of a CU to obtain H ($P_0$), H ($P_1$), and H (orig) respectively, then the Hadamard transform of all BCW bi-prediction candidates sharing the same predictors and original samples of the CU can be easily generated by multiplying different sets of weights to the L0 predictors and L1 predictors. In the normal hardware implementation, five Hadamard circuits are required for calculating the SATDs of the five BCW candidates in the low-delay case, and three Hadamard circuits are required for calculating the SATDs of the three BCW candidates in the random access case. In this embodiment of reusing the Hadamard transform results of the L0 predictor, L1 predictor, and original samples, regardless the number of BCW weight options tested in the LC RDO stage, only three Hadamard circuits are needed for all BCW candidates with the same L0 and L1 predictors but different weighting parameters.

In the LC RDO stage, many bi-prediction candidates of a current CU are tested at the same time in order to select a best candidate for encoding the current CU, these bi-prediction candidates use the same original samples. The Hadamard transform of the original samples H (orig) is further shared for all the bi-prediction candidates of the current CU according to an embodiment of the present invention. This embodiment of sharing the Hadamard transform of the original samples is combined with the embodiment of applying Hadamard transform to the L0 predictor, L1 predictor, and original samples for the BCW bi-prediction candidates. For example, there are 50 BCW bi-prediction candidates to be tested in the LC RDO stage, the number of Hadamard transform circuits required in the normal hardware implementation is equal to 3*50=150 for the random access case, or 5*50=250 in the low-delay case. It was based on the fact that one Hadamard transform circuit is needed for each weighting parameter applied in each BCW bi-prediction candidate. The number of Hadamard transform circuits required for both the random access and low-delay cases is 2*50+1=101 according to this embodiment of the present invention. For each of the 50 BCW bi-prediction candidates, one Hadamard transform circuit is used to calculate the Hadamard transform of the L0 predictor and another Hadamard transform circuit is used to calculate the Hadamard transform of the L1 predictor. These two Hadamard transform circuits are shared for all the different BCW weighting parameters applied to the BCW bi-prediction candidate. One Hadamard transform circuit used to calculate the Hadamard transform of the original samples is shared for all the 50 BCW bi-prediction candidates and respective different weighting parameters. The number of Hadamard transform circuits required for 50 BCW bi-prediction candidates is the same regardless the number of BCW weighting parameters tested in the LC RDO stage.

Figure 9:
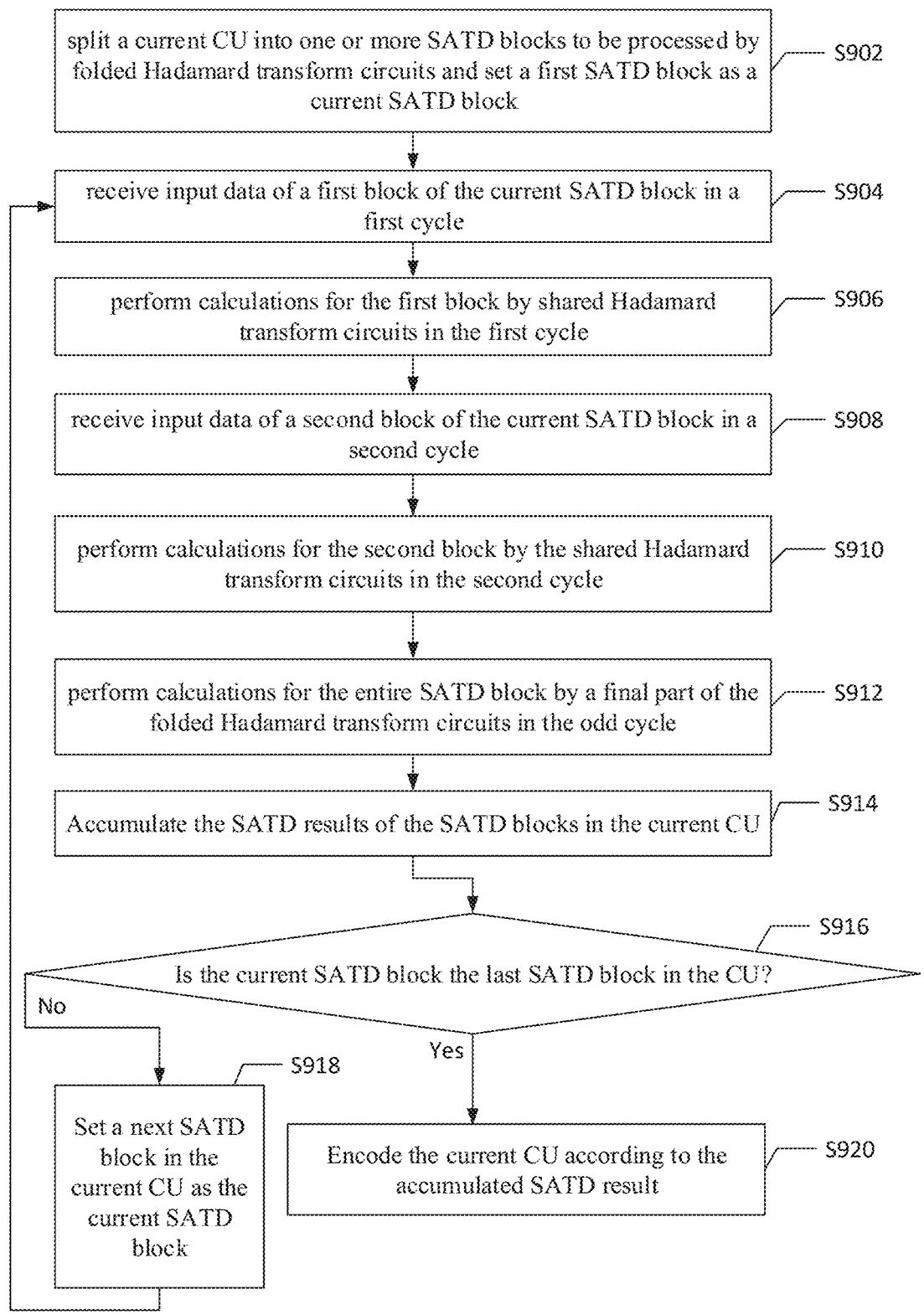
FIG. 9 is a flowchart illustrating an embodiment of the video encoding method for encoding a current block by computing a SATD of the current block using folded Hadamard transform circuits.

Representative Flowcharts for SATD Computation in Video Encoding FIG. 9 is a flowchart illustrating implementing an exemplary embodiment of the folded Hadamard transform circuit in a video encoding system. In step S902, the video encoding system splits a current Coding Unit (CU) into one or more SATD blocks to be processed by folded Hadamard transform circuits and sets a first SATD block in the current CU as a current SATD block. The folded Hadamard transform circuits receive input data of a first block of the current SATD block in a first cycle in step S904 and shared Hadamard transform circuits of the folded Hadamard transform circuits perform calculations for the first block of the current SATD block in the first cycle in step S906. The folded Hadamard transform circuits receive input data of a second block of the current SATD block in a second cycle after the first cycle in step S908 and the shared Hadamard transform circuits perform calculations for the second block in the second cycle in step S910. In this embodiment, there are two blocks in each SATD block and the shared Hadamard transform circuits process one of the two blocks in one cycle. In another embodiment, there are four blocks in each SATD block and the encoding process further includes steps for receiving third and fourth blocks of the current SATD block, and steps for performing calculations for the third and fourth blocks by the shared Hadamard transform circuits in a subsequent third and fourth cycle respectively. A final part of each folded Hadamard transform circuits performs calculations for the entire SATD block to generate a final SATD result of the current SATD block in step S912. In step S914, the SATD results of the SATD blocks in the current CU are accumulated to derive an accumulated SATD result of the current CU. The video encoding system checks whether the current SATD block is the last SATD block in the current CU in step S916, and if the current SATD block is not the last SATD block, a next SATD block in the current CU is set as the current SATD block in step S918, and the current SATD block is processed from step S904 to step S914. If the current SATD block is the last SATD block in the current CU, the current CU is encoded according to the accumulated SATD result of the current CU in step S920. In some embodiments, the accumulation step in step S914 may be performed in parallel with step S916 or in parallel with any of step S904 to S914 for next SATD block, which should not be limited in this disclosure.

Figure 10:
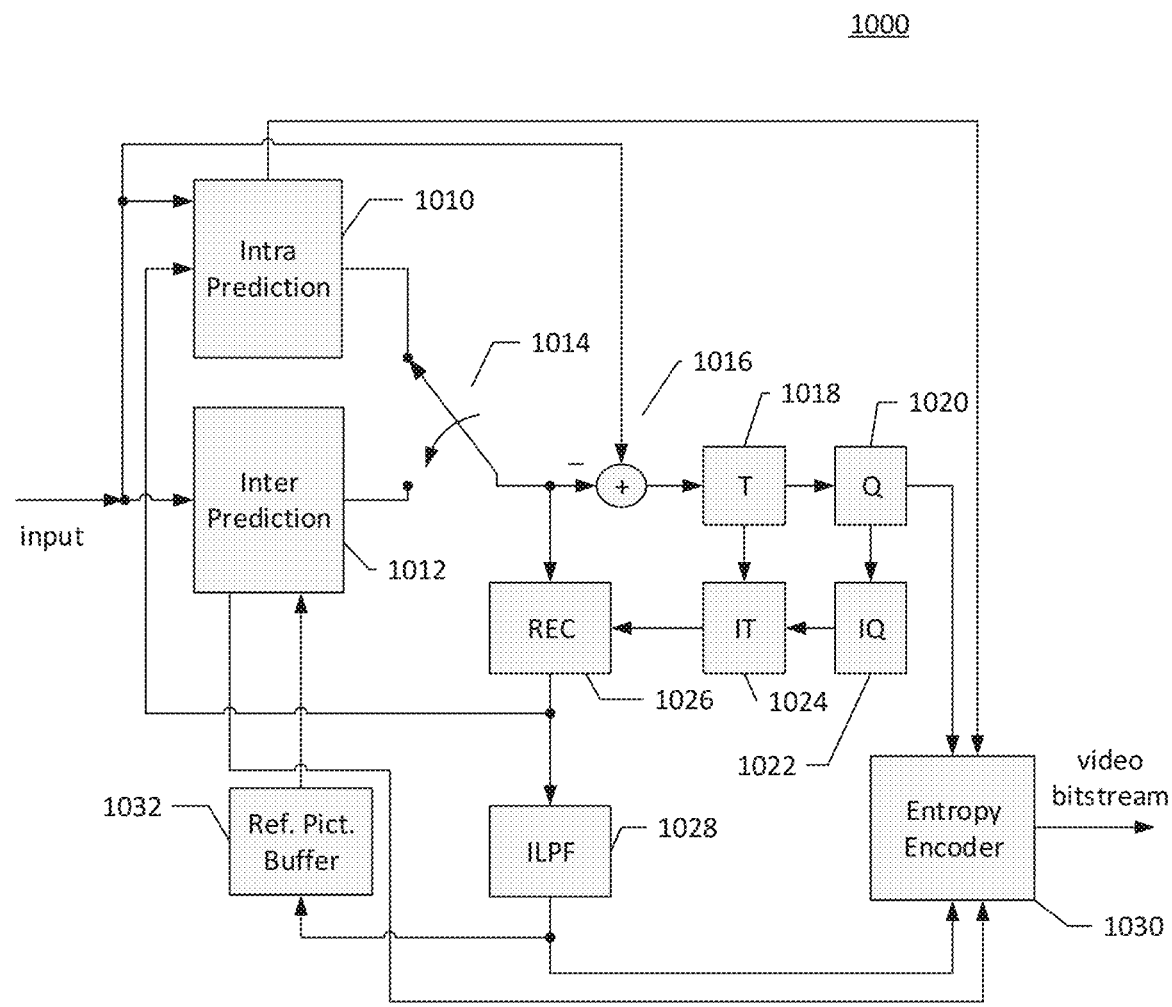
FIG. 10 illustrates an exemplary system block diagram for a video encoding system incorporating one or a combination of the video encoding methods according to some embodiments of the present invention.

Representative System Block Diagrams FIG. 10 illustrates an exemplary system block diagram for a Video Encoder 1000 implementing one or more embodiments of the folded Hadamard transform circuit. Intra Prediction module 1010 provides intra predictors based on reconstructed video data of a current picture. Inter Prediction module 1012 performs Motion Estimation (ME) and Motion Compensation (MC) to provide predictors based on referencing video data from other picture or pictures. Either Intra Prediction module 1010 or Inter Prediction module 1012 supplies the selected predictor to Adder 1016 to form residues according to a coding decision made by the Rate and Distortion Optimization (RDO) technique. The coding decisions were made based on SATD results or SAD results computed by an embodiment of the SATD circuit implemented by folded Hadamard transform circuits. The residues of the current block are further processed by Transformation module (T) 1018 followed by Quantization module (Q) 1020. Quantization module 1020 receives transform coefficients of each transform block from Transformation module 1018, and applies a quantization processing to generate a transformed and quantized residual signal. The transformed and quantized residual signal is then encoded by Entropy Encoder 1030 to form a video bitstream. The video bitstream is then packed with side information. The transformed and quantized residual signal of the current block is processed by Inverse Quantization module (IQ) 1022 and Inverse Transformation module (IT) 1024 to recover the prediction residues. As shown in FIG. 10, the residues are recovered by adding back to the selected predictor at Reconstruction module (REC) 1026 to produce reconstructed video data. The reconstructed video data may be stored in Reference Picture Buffer (Ref. Pict. Buffer) 1032 and used for prediction of other pictures. The reconstructed video data from REC module 1026 may be subject to various impairments due to the encoding processing, consequently, In Loop Processing Filter (ILPF) 1028 is applied to the reconstructed video data before storing in the Reference Picture Buffer 1032 to further enhance picture quality. Syntax elements are provided to Entropy Encoder 1030 for incorporation into the video bitstream.

Various components of Video Encoder 1000 in FIG. 10 may be implemented by hardware components, one or more processors configured to execute program instructions stored in a memory, or a combination of hardware and processor. For example, a processor executes program instructions to perform calculations for SATD blocks to generate SATD results. The processor is equipped with a single or multiple processing cores. In some examples, the processor executes program instructions to perform functions in some components in Encoder 1000, and the memory electrically coupled with the processor is used to store the program instructions, information corresponding to the reconstructed images of blocks, and/or intermediate data during the encoding process. The memory in some embodiment includes a non-transitory computer readable medium, such as a semiconductor or solid-state memory, a Random Access Memory (RAM), a Read-Only Memory (ROM), a hard disk, an optical disk, or other suitable storage medium. The memory may also be a combination of two or more of the non-transitory computer readable medium listed above.

Embodiments of the video data processing method performing a specific process on a current slice in a video encoding system may be implemented in a circuit integrated into a video compression chip or program code integrated into video compression software to perform the processing described above. For examples, scaling transform coefficient levels in a current transform block may be realized in program code to be executed on a computer processor, a Digital Signal Processor (DSP), a microprocessor, or field programmable gate array (FPGA). These processors can be configured to perform specific tasks according to the invention, by executing machine-readable software code or firmware code that defines the methods embodied by the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A video encoding method for computing a Sum of Absolute Transformed Difference (SATD) of a current block by folded Hadamard transform circuits in a video encoding system, comprising:
   splitting the current block into one or more SATD blocks;
   receiving input data associated with a first block of a first SATD block of the current block in a first cycle and receiving input data associated with a second block of the first SATD block in a second cycle after the first cycle;
   performing calculations for the first block by shared Hadamard transform circuits in the first cycle, and performing calculations for the second block by the shared Hadamard transform circuits in the second cycle, wherein each of the shared Hadamard transform circuits is a first part of each of the folded Hadamard transform circuits;
   performing calculations for the entire first SATD block by a final part of each folded Hadamard transform circuit to generate a final SATD result of the first SATD block;
   accumulating the final SATD result(s) of the one or more SATD blocks in the current block to generate a final SATD result of the current block; and
   encoding the current block according to the final SATD result of the current block.

2. The method of claim 1, wherein each SATD block is a 4×8 block, the first block is a top 4×4 block of the 4×8 block, and the second block is a bottom 4×4 block of the 4×8 block; wherein calculations for the entire first SATD block to generate the final SATD result is performed in a third cycle after the second cycle.

3. The method of claim 2, wherein the folded Hadamard transform circuits are folded 8-point Hadamard transform circuits, and the shared Hadamard transform circuits are 4-point Hadamard transform circuits.

4. The method of claim 1, wherein each SATD block is a 4×16 block, the first block is a top 4×4 block of the 4×16 block, and the second block is a second 4×4 block of the 4×16 block; wherein the video encoding method further receives input data associated with a third 4×4 block of the 4×16 block and performs calculations for the third 4×4 block by the shared Hadamard transform circuits, receives input data associated with a fourth 4×4 block of the 4×16 block and performs calculations for the fourth 4×4 block by the shared Hadamard transform circuits.

5. The method of claim 1, wherein a size of the first block and the second block correspond to a throughput of a prediction stage.

6. The method of claim 1, wherein a calculation order in each of the folded Hadamard transform circuits allows the calculations related to the first block of each SATD block are computed in the first cycle.

7. The method of claim 1, further comprising buffering temporary results of the first block of the first SATD block computed by the shared Hadamard transform circuits in a plurality of registers.

8. The method of claim 7, wherein performing calculations for the entire first SATD block by the final part of each folded Hadamard transform circuit comprises combining temporary results of the second block of the first SATD block computed by the shared Hadamard transform circuits with data stored in the registers.

9. The method of claim 1, wherein the final part of each folded Hadamard transform circuit comprises a plurality of absolute operations and a plurality of registers, and each absolute operation is shared by multiple inputs; wherein performing calculations for the entire first SATD block by the final part of each folded Hadamard transform circuit comprises storing some of the multiple inputs to the absolute operations in the registers and processing the multiple inputs by the absolute operations in a time interleaving manner.

10. The method of claim 9, wherein the registers buffer temporary results of the shared Hadamard transform circuits in even cycles and buffer some of the multiple inputs to the absolute operations in odd cycles, or the registers buffer temporary results of the shared Hadamard transform circuits in odd cycles and buffer some of the multiple inputs to the absolute operations in even cycles.

11. The method of claim 1, wherein the folded Hadamard transform circuits are reused for Sum of Absolute Difference (SAD) computation.

12. The method of claim 1, wherein input data associated with the current block comprises differences between original samples and a predictor of the current block, wherein performing calculations to generate the final SATD result comprises applying a Hadamard transform to the differences to generate transform differences for the current block.

13. The method of claim 1, wherein the current block is encoded by a Bi-prediction with Coding unit level Weights (BCW) candidate with a set of weights, and input data of the current block comprises a List 0 predictor, a List 1 predictor, and original samples of the current block, wherein performing calculations comprises applying a Hadamard transform to the List 0 predictor, applying a Hadamard transform to the List 1 predictor, and applying a Hadamard transform to the original samples, and the final SATD result of encoding the current block by the BCW candidate is derived by the Hadamard transform of the List 0 predictor and the Hadamard transform of the List 1 predictor multiplying the set of weights, and the Hadamard transform of the original samples.

14. The method of claim 13, wherein the Hadamard transform of the List 0 predictor, the Hadamard transform of the List 1 predictor, and the Hadamard transform of the original samples are reused in calculating a final SATD result of encoding the current block by another BCW candidate having same List 0 and List 1 predictors but with another set of weights.

15. The method of claim 13, wherein the Hadamard transform of the original samples of the current block is reused in calculating a final SATD result of encoding the current block by another BCW candidates having same or different List 0 and List 1 predictors.

16. The method of claim 1, wherein the second cycle is next to or following the first cycle.

17. The method of claim 1, wherein the first cycle is an even or odd cycle, and the second cycle is an odd cycle following the even cycle or an even cycle following the odd cycle.

18. An apparatus for computing a Sum of Absolute Transformed Difference (SATD) of a current block by folded Hadamard transform circuits in a video encoding system, the apparatus comprising one or more electronic circuits configured for:
   splitting the current block into one or more SATD blocks;
   receiving input data associated with a first block of a first SATD block in a first cycle and receiving input data associated with a second block of the first SATD block in a second cycle after the first cycle;
   performing calculations for the first block by shared Hadamard transform circuits in the first cycle, and performing calculations for the second block by the shared Hadamard transform circuits in the second cycle, wherein each of the shared Hadamard transform circuits is a first part of each of the folded Hadamard transform circuits;
   performing calculations for the entire first SATD block by a final part of each folded Hadamard transform circuit to generate a final SATD result of the first SATD block;
   accumulating the final SATD result(s) of the one or more SATD blocks in the current block to generate a final SATD result of the current block; and
   encoding the current block according to the final SATD result of the current block.

* * * * *